United States Patent [19]

Campbell

[11] Patent Number: 4,692,829
[45] Date of Patent: Sep. 8, 1987

[54] MAGNETICALLY BIASED AERODYNAMICALLY RELEASED INTEGRAL SAFETY LATCH FOR RIGID DISK DRIVE

[75] Inventor: Steve G. Campbell, San Jose, Calif.

[73] Assignee: Quantum Corporation, Milpitas, Calif.

[21] Appl. No.: 775,840

[22] Filed: Sep. 13, 1985

[51] Int. Cl.$^4$ .......................... G11B 5/54; G11B 21/22
[52] U.S. Cl. ..................................... 360/105; 360/86; 360/103
[58] Field of Search ......................... 360/105, 102–103, 360/97–99, 133, 137, 75, 86

[56] References Cited

U.S. PATENT DOCUMENTS

| | | | |
|---|---|---|---|
| 4,131,921 | 12/1978 | Gruczelak | 360/137 |
| 4,139,874 | 2/1979 | Shiraishi | 360/86 |
| 4,371,903 | 2/1983 | Lewis | 360/105 X |
| 4,375,070 | 2/1983 | Isozaki et al. | 360/105 X |
| 4,484,241 | 11/1984 | Brende et al. | 360/105 |
| 4,535,374 | 8/1985 | Anderson et al. | 360/103 |
| 4,538,193 | 8/1985 | Dimmick et al. | 360/137 |
| 4,562,500 | 12/1985 | Bygdnes | 360/105 |
| 4,647,997 | 3/1987 | Westwood | 360/105 |

FOREIGN PATENT DOCUMENTS 0175839 5/1985 European Pat. Off. .

OTHER PUBLICATIONS

IBM Journal of Research and Development, Aerodynamic Aspects of Disk Files, E. Lennemann, Nov. 1974, pp. 480–488.

Primary Examiner—Stuart N. Hecker
Assistant Examiner—David J. Severin
Attorney, Agent, or Firm—David B. Harrison

[57] ABSTRACT

An improved safety latch is provided for a data storage device, for locking the transducer carriage to restrain the data transducer to a predetermined landing zone during non-rotation of data storage disks and for releasing the carriage in response to airflow generated by disk rotation, the latch comprising an integral member including a moveable airvane disposed between two disks for being deflected by airflow generated by rotation of the disks, a latching member responsive to deflection of the airvane means to release the carriage and an integral counterweight. The latch includes a magnetic bias spring for providing a predetermined bias by magnetic field deflection to the latch in order to urge the latch into engagement with the carriage in the absense of airflow sufficient to deflect the airvane means to overcome the bias and thereby release the latch.

9 Claims, 6 Drawing Figures

MAGNETICALLY BIASED AERODYNAMICALLY RELEASED INTEGRAL SAFETY LATCH FOR RIGID DISK DRIVE

BACKGROUND OF THE INVENTION

The present invention relates to safety (shipping) latches for latching the data transducer head and arm assembly at a safe region relative to a data storage surface in a rotating rigid disk data storage device. More particularly, the present invention relates to an integrally formed and magnetically biased aerodynamically released shipping latch for a rigid disk drive.

REFERENCE TO RELATED PATENTS

The reader's attention is directed to U.S. patent application Ser. No. 439,897, filed on Nov. 8, 1982, for "Aerodynamically Released Safety Latch for Data Transducer Assembly in Rotating Rigid Disk Data Storage Device", now U.S. Pat. No. 4,538,193. This referenced patent is commonly owned with the present patent, and the disclosure of the referenced patent is incorporated herein by this reference.

The reader's attention is further directed to U.S. patent application Ser. No. 728,674 filed on Apr. 29, 1985, for "Aerodynamic Latch for Disk File Actuator", now U.S. Pat. No. 4,647,997, the disclosure of which is also incorporated herein by reference.

Aerodynaically released shipped latches of the type described in the reference patents have proven very successful in operation. The distinct advantage of an aerodynamically released shippng latch and its manner of operation are explained in these cited references.

Several drawbacks of aerodynamically released shipping latches in accordance with the inventions described in the cited references have remained unsolved until the present invention. One drawback has been associated with the use of mechanical hair springs which are required in order to provide a sufficient reverse bias force to the latch in order to cause it to engage the rotary data transducer assembly in order to lock the transducer at inner landing zone regions of the data surfaces of the storage disks. Installation of the delicate hair springs during drive assembly has proven to be a difficult manual procedure and has not lent itself to automated assembly procedures (robotics). Also, the reverse bias force applied by mechanical hair springs has tended to be substantially constant, irrespective of the degree of angular deflection caused by air flow from the rotating disks, which has required that the bias force be sufficiently high to overcome any static friction associated with the moving aerodynamic latch member and the base or frame of the device to which such moving member is journalled.

Another drawback has been associated with the use of a substantial range of angular displacement of the prior latches. It was heretofore believed that the shipping latch should rotate over a fairly substnatial angle in response to air flow in order to be assured that the air flow generated by disk rotation was sufficient to sustain the data transducers in "flying" formation closely above the data surfaces of the disks before they were permitted to depart from their respective landing zones. Also, a substantial degree of rotation of the latch was required in order to permit the latch to be installed after the disk stack has been mounted to the drive spindle during disk drive assembly.

One more drawback has been associated with the use of a separate counterweight which has required additional parts and steps in the manufacturing process.

Thus, a need has arisen for an aerodynamically released shippng latch which operates over a narrower range of displacement than heretofore, for a simplified and more effective latch bias spring which provides a reverse bias force increasing exponentially in accordance with the amount of displacement of the latch itself, and wherein the moving latch mechanism is integrally formed with its own counterweight.

SUMMARY OF THE INVENTION WITH OBJECTS

A general object of the present invention is to provide an improved aerodynamically released shipping latch for a rotating rigid disk data storage device which overcomes limitations and drawbacks of the prior art.

A specific object of the present invention is to provide a magnetic bias spring for reverse biasing a limited displacement, aerodynamically released shipping latch for a disk drive in a manner in which the bais force applied to the latch increases in relation to the amount of displacement brought about by air flow from rotation of the data storage disks.

Another object of the present invention is to provide a mechanical configuration of a disk drive which enables a limited displacement, magnetically biased, aerodynamically released shipping latch to operate effectively and reliably.

A further object of the present invention is to provide an opposed pole magnetic bias spring for an aerodynamically released shipping latch in a disk drive which generates a reverse bias force which cooperates with a counterforce generated by air flow to enable the latch to engage and release the head transducer assembly in a positive, repeatable and reliable manner and which provides a sufficient margin for manufacturing tolerances.

One other object of the present invention is to provide a shipping latch and air vane which includes integrally a counterwieght for counterbalancing the latch-air vane structure in order to render it insensitive to disk drive orientation and gravitational force.

A further object of the present invention is to provide for an aerodynamically biased shipping latch mechanism which is considerably simplified over prior approaches, which operates reliably over the entire useful life of the disk drive and which facilitates robotic assembly of the disk drive.

In one aspect the present invention relates to an improved safety latch for a data storage device, for locking the transducer carriage to restrain the data transducer to a predetermined landing zone during non-rotation of data storage disks and for releasing the carriage in response to airflow generated by disk rotation, the latch including a moveable airvane disposed between two disks for being deflected by airflow generated by rotation of the disks and a latching member responsive to deflection of the airvane means to release the carriage. In this first aspect the latch includes a magnetic bias spring for providing a predetermined bias by magnetic field deflection to the latch in order to urge the latch into engagement with the carriage in the absence of airflow sufficient to deflect the airvane to overcome the bias and thereby release the latch.

In a second aspect the magnetic bias spring comprises a plurality of permanent magnets arranged with like magnetic poles in facing relationship and wheein the bias is provided by the repulsion of the oppositely facing, like magnetic poles as the magnets move into proximity with each other.

In a third aspect the latch is rotatable over a small arc about an axis of rotation, the airvane is disposed on one side of the axis of rotation, the latching member is disposed on the other side of the axis of rotation, and one of the permanent magnetis is mounted on the latching member and oriented to approach the other permanent magnet mounted on or to the frame as the airvane rotates in response to airflow.

In a fourth aspect the latch is a single, integral moving member including an airvane portion disposed on one side of the axis of rotation and extending between a pair of the disks, a latching portion disposed on the other side of the axis of rotation for engaging the carriage in the absence of deflection from airflow, and a counterweight portion to eliminate any gravitational force effect upon the latch and thereby enable the device to operate effectively in any desired orientation with respect to gravitational force.

The foregoing and other objects, advantages and features of the present invention will be further appreciated and better understood by considering the following detailed description of a preferred embodiment, presented in conjunction with the accompanying drawings.

BRIEF DESCRIPTON OF THE DRAWINGS

DETAILED DESCRIPTION OF A PREFERRED EMBODIMENT

Figure 1:
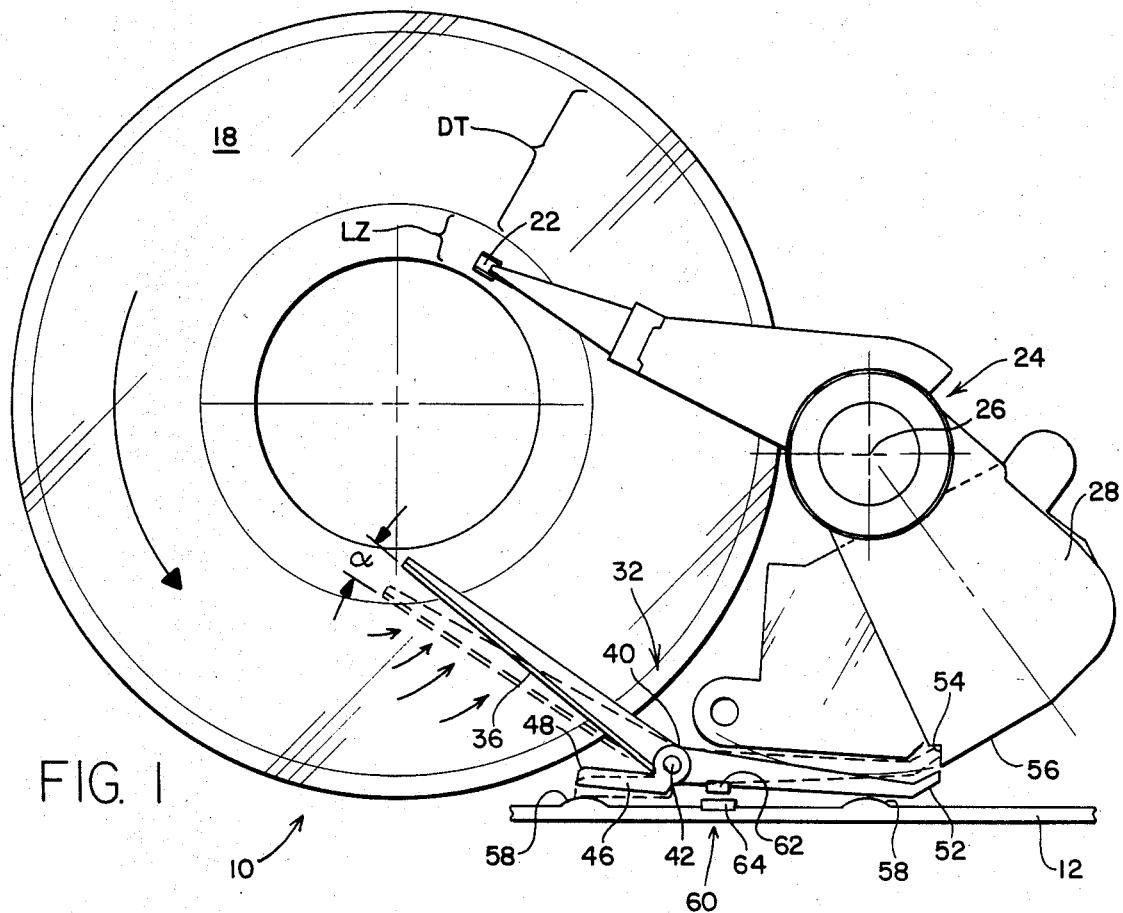
FIG. 1 is a diagrammatic plan view of an improved aerodynamic latching mechanism for a disk drive incorporating the principles of the present invention, with the latching position of the mechanism being shown in broken lines.
Figure 2:
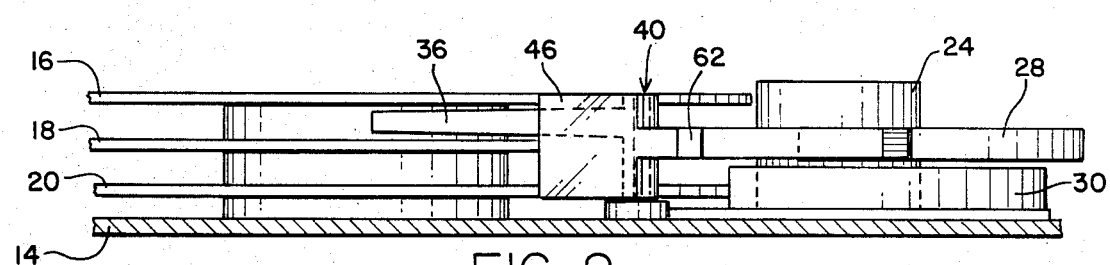
FIG. 2 is a diagrammatic view in section and elevation showing the latching mechanism depicted in FIG. 1.

A head and disk assembly 10 of a rigid rotating disk drive data storage device is depicted in FIGS. 1 and 2. Therein, the assembly 10 is shown to include a sidewall portion 12 of a base casting or frame 14, three data storage disks 16, 18, and 20 which are commonly journalled to the frame 14 via a direct drive spindle motor (not shown). One of the disks 18 and a data transducer 22 are shown together in FIG. 1. The data transducer 22 is one of six such transducers, there being one for each data surface of each disk. The transducers are commonly mounted to a rotary carriage 24 which is journalled for rotation at an axis 26. A moving magnetic coil assembly 28 counterbalances the carriage 24 and provides the torque needed to move the carriage through its range of limited angular displacement. A permanent magnet 30 underlies the coil assembly 28 and the opposed pole regions thereof cooperate with the bobbin winding of the assembly 28 in order to move the carriage 24 in either direction, depending upon the direction of direct current flowing in the bobbin winding.

The transducer 22 is moveable between a landing zone LZ and a multiplicity of concentric data tracks DT defined on the storage surface of the disk 18. To prevent damage to the data tracks when the transducers are not flying on an air bearing generated by rotation of the disks 16, 18, 20, it is known to restrain the transducers to the landing zone LZ. The patents referenced above are directed specifically to this task of restraining the carriage to hold the transducers at the landing zone in the absence of airflow from the disks.

Figure 4:
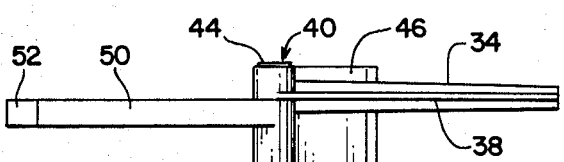
FIG. 4 is an elevational view of the integral latching mechanism depicted in FIG. 1 presented in opposite sense to the depiction thereof in FIG. 2.
Figure 5:
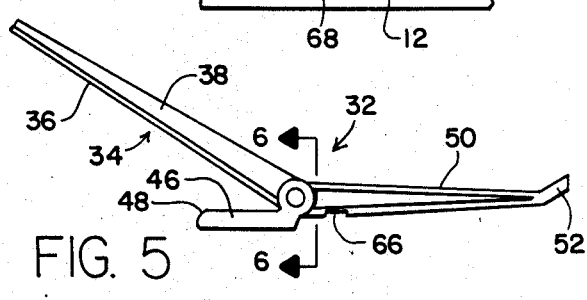
FIG. 5 is a plan view of the integral latching mechanism of FIG. 1 presented outside of its environment in order to aid understanding.

An integrally molded aerodynamic latch member 32, preferably formed of plastic material, is in accordance with the principles of the present invention. The member 32 includes a single airvane portion 34 which is disposed between two disks 16, 18, as shown in FIG. 2. The airvane portion 34 extends almost to the inner hub region of the disk spindle so as to present a substantial vane surface to airflow generated by rotation of the disks 16, 18. The airvane portion 34 includes a flat frontal surface 36, and a central reinforcement rib 38 on the back side, seen best in FIG. 4. A central journal region 40 defines a vertical axial opening enabling the member 32 to be rotatably mounted to the frame 14 via a pin 42. The pin 42 is seated in a well formed to receive the pin, and it is retained in place by a gasket at a top cover which encloses the interior of the head and disk assembly to assure its air-tightness and freedom from atmospherically borne particulate contamination.

Annular chamfers 44 are provided at the ends of the central region 40 in order to minimize surface contact between the moving member 32 and the stationary frame 14, thereby reducing static friction loading.

A box-shaped counterweight 46 is formed integrally with the member 32. The counterweight is sized and disposed to counterbalance the member. One corner 48 thereof is bevelled to improve airflow characteristics and to provide clearance between the counterweight 46 and the peripheries of the disks 16, 18 and 20.

Figure 6:
FIG. 6 is a cross-section of a latching portion of the mechanism of FIG. 1, taken along the line 6—6 in FIG. 5.

A latching portion 50 of the member extends from the central region 40 to a distal latch finger 52. For most of its length, the portion 50 defines an "H" shape in cross-section, as shown in FIG. 6, and it converges to a square cross section at the latch finger 52. The finger 52 engages a notch 54 formed in the counterbalancing coil assembly 28 when the transducers are located at the landing zone LZ, and the finger follows the peripehral surface 56 of the assembly 28 when the finger 52 clears the notch as the member 32 rotates in response to airflow, depicted by the small arrows in FIG. 1.

The longitudinal axis of the airvane portion 34 forms an obtuse angle with the longitudinal axis of the latching portion 50, approximately 150 degrees in the preferred embodiment. The angular deflection of the member 32 resulting from airflow impingement upon the airvane portion 34 is quite limited, distending an angle alpha of approximately six degrees in the present embodiments. Stops 58 formed on the inside of the sidewall 12 limit the angular displacement of the member 32 to the small arc. This limited angular displacement enables effective operation of the magnetic bias spring 60, now to be described.

Figure 3:
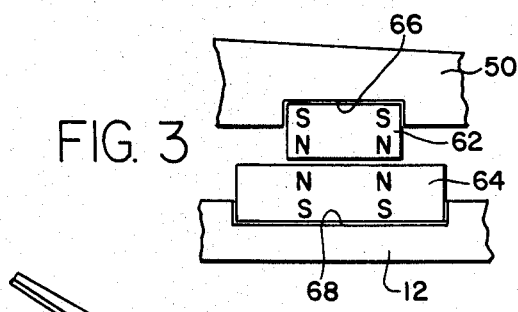
FIG. 3 is an enlarged detail plan view of a magnetic bias spring portion of the latching mechanism depicted in FIG. 1.

Two small plastic permanent magnets 62 and 64 are arranged to have north poles on major surfaces facing each other, as shown in FIGS. 1 and 3. The magnet 62 is seated in a shallow recess 66 formed in the latching portion 50 of the member 32, and the magnet 64 is seated in a similar recess 68 formed in the inside of the sidewall 12 of the frame. The magnets 62 and 64 are flat and shallow, and present their oppsoitely facing, like poel faces in a manner which generates maximum repulsion when the member 32 is maximally deflected due to air flow. The two forces create a state of equilibrium, and in operation, the two magnets 62, 64 do not actually contact each other. The sizes, locations and magnetic field strength characteristics of the magnets 62 and 64 are selected to provide suitable reverse bias force to the member so that it will be positively and reliably urged to engage the notch 52 when airflow from disk rotation diminishes to a point that the reverse bias from the magnets 62, 64 exceeds the airflow force.

An oppositely facing, like pole arrangement for the magnetic bias spring 60 is presently preferred, as it provides a precisely controllable bias force which, while non-linear, smoothly deflects the latch member 32 to the latching position in the absence of sufficient airflow. Other magnetic bias spring arrangements are within the scope of the present invntion. For example, a complementary pole arrangement may be useful in situations where a hysteresis-like threshold characteristic for the latching mechanism is desired. In such arrangements, sufficient airflow must be first generated to overcome the positive attraction of the magnets, resulting in the threshold characteristic. Permanent magnets are presently preferred, in order to latch the carriage 24 to hold the transducers at the landing zones during shipment and handling.

It will be appreciated by the reader skilled in the art that return spring means must be provided to return the carriage 24 to the landing zone position whenever disk rotation is to cease. One known technique during power down operations is to sump the kinetic energy stored in the spindle and disks into the actuator coil 28 by converting this kinetic energy into electrical energy with the spindle motor acting as a generator. In this manner the energy stored in the rotating disks after driving force from the spindle motor has ceased may be used to move the carriage to return the transducers to the landing zone. In the event that airflow becomes insufficient to deflect the airvane portion 34 during the power down sequence, the latching finger 52 contacts and follows the outer peripheral camming surface 56 of the counterbalancing coil assebly 28, until the notch 54 is reached.

The member 32 must be installed during assembly of the disk drive 10. Since there is no adjustment required of the latch mechanism, robotic insertion of the member 32 is easily carried out as part of an overall automated assembly procedure. After the disks 20 and 18 have been placed on the spindle, the member 32 is automatically placed over the journal pin 42. Then, the last disk 16 is placed on the spindle and the disks are secured thereto. The transducer carriage assembly 24 may then be installed with suitable tooling and procedures.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosures and the description herein are purely illustrative and are not intended to be in any sense limiting.

I claim:

1. In a data storage device including a frame and a plurality of rigid rotatable disks, at last one of which provides a data storage surface for storage and retrieval of useful data, at least one moveable data transducer for reading and writing data from and to selectable concentric data tracks of said data storage surface, said transducer adapted for flying in close non-contacting proximity to said data storage surface upon an air cushion provided during disk rotation, there being a landing zone for the transducer on the surface during non-rotation of the disks, and there being a carriage for moving the transducer from the landing zone to any one of the selectable data tracks during operation of the device, an improved safety latch for locking the transducer carriage to restrain the transducer to the landing zone during non-rotation of the disks and for releasing the carriage in response to airflow generated by disk rotation, the latch including moveable airvane means disposed between two disks for being deflected means responsive to deflection of the airvane means to release the carriage, and the carriage including engagement means for enabling locking engagement by the safety latch during disk non-rotation and release by the safety latch in response to airflow so that the transducer may thereafter be moved to the data tracks, the safety latch further including magnetic bias spring means for providing a predetermined bias force by repulsion of oppositely facing, like magnetic poles to the safety latch in order to urge the safety latch into engagement with the carriage in the absence of airflow sufficient ot deflect the airvane means to overcome the bias and thereby release the safety latch.

2. The improvied safety latch set forth in claim 1 wherein the magnetic bias spring means comprises a plurality of permanent magnets arranged with magnetic poles in oppositely facing, like pole relationship and wherein the bias force is provided by the repulsion of the oppositely facing, like magnetic poles as the magnets move into proximity with each other.

3. The improved safety latch set forth inclaim 2 wherein the latch is rotatble over a small arc about an axis of rotation, wherein the airvane means is disposed on one side of the axis of rotation, wherein the latching means is disposed on the otehr side of the axis of rotation, and wherein one of said permanent magnets is mounted on the latching means and oriented to approach the othe permanent magnet as the airvane means rotates in response to airflow.

4. The improved safety latch set forth in claim 3 wherein the small arc is not greater than ten degrees of rotation.

5. The improved safety latch set forth in claim 3 wherein said latch is a single integral structure and includes integrally formed therewith a counterweight to eliminate any gravtitational force effect upon the latch and thereby enable the device to operate effectively in any desired orientation with respect to gravitational force.

6. The improved safety latch set forth in claim 3 wherein the carriage is rotatable about an axis of rotation, and wherein the latching means releasably engages a notch formed in the carriage.

7. The improved safety latch set forth in claim 6 wherein the latching means follows a surface of the carriage throughout its range of angular displacement, which surface terminates at the notch when the carriage is displaced to locate the transducer at the landing zone.

8. The improved safety latch set forth in claim 7 wherein the surface is an outer peripheral surface of a counterweight disposed opposite the transducer.

9. In a data storage device including a frame and a plurality of rigid rotatble disks, at least one of which provides a data storage surface for storage and retrieval of useful data, at least one moveable data transducer for reading and writing data from and to selectabel concentric data tracks of said data storage surface, said transducer flying in close non-contacting proximity to said data storage surface upon an air cushion provided during disk rotation, there being a landing zone for the transducer on the surface during nonrotation of the disks, and therebeing a carriage for moving the transducer from the landing zone to any one of the selectable data tracks during operation of the device, an improved safety latch for locking the transducer carriage to restrain the transducer to the landing zone during non-rotation of the disks in response to a bias force provided by a bias spring means and for releasing the carriage in response to airflow generated by disk rotation which overcomes the bias force, and wherein the latch is rotatable over a small arc about an axis of rotation, and the carriage including engagement means for enabling locking engagement by the safety latch during disk nonrotation and release by the safety latch in response to airflow so that the transducer may thereafter be moved to the data tracks, the latch comprising an integral structure including an airvane portion disposed on one side of the axis of rotation and extending between a pair of the disks, a latching portion disposed on the other side of the axis of rotation for engaging the carriage in the absence of deflection from airflow, and a counterweight portion to eliminate any gravitational force effect upon the latch and thereby enable the device to operate effectively in any desired orientation with respect to gravitational force, and wherein the bias spring means comprises a plurality of oppositely facing, like magnetic pole permanent magnets with one of the magnets being mounted on the latching portion and the other portion mounted on the frame, the one magnet being oriented to approach the other magnet as the latch rotates in response to airflow, the bias force being generated by repulsion of the oppositely facing, like poles of the two magnets as they approach each other.

* * * * *